United States Patent [19]

Erb

[11] 4,212,291

[45] Jul. 15, 1980

[54] BATTEN FOR MOUNTING A UNITARY SOLAR COLLECTOR PANEL

[75] Inventor: Robert A. Erb, Valley Forge, Pa.

[73] Assignee: The Franklin Institute, Philadelphia, Pa.

[21] Appl. No.: 930,796

[22] Filed: Aug. 3, 1978

Related U.S. Application Data

[63] Continuation-in-part of Ser. No. 645,648, Dec. 31, 1975, Pat. No. 4,114,597.

[51] Int. Cl.² .................. F24J 3/02; E04C 1/34
[52] U.S. Cl. .................. 126/445; 52/309.1; 52/464; 52/465; 126/450; 126/441
[58] Field of Search ............. 126/270, 271, 445, 441, 126/450, 448; 52/464, 465, 309.1

[56] References Cited

U.S. PATENT DOCUMENTS

| B 512,745 | 1/1976 | Deminet et al. | 126/271 |
|---|---|---|---|
| 871,318 | 11/1907 | Bischoff | 52/464 |
| 2,693,939 | 11/1954 | Marchant et al. | 126/271 |
| 3,127,639 | 4/1964 | Hammitt et al. | 52/464 |
| 3,320,706 | 5/1967 | Elliott et al. | 52/465 |
| 3,937,208 | 2/1976 | Katz | 126/271 |
| 3,980,071 | 9/1976 | Barber | 126/271 |
| 4,010,733 | 3/1977 | Moore | 126/271 |
| 4,048,981 | 9/1977 | Hobbs | 126/271 |
| 4,062,352 | 12/1977 | Lesk | 126/271 |
| 4,076,013 | 2/1978 | Bette | 126/271 |
| 4,090,494 | 5/1978 | Borst et al. | 126/270 |
| 4,106,483 | 8/1978 | Barber | 126/271 |
| 4,108,155 | 8/1978 | Koizumi et al. | 126/271 |
| 4,120,287 | 10/1978 | Marles et al. | 126/271 |
| 4,127,102 | 11/1978 | Berman | 126/271 |

Primary Examiner—James C. Yeung
Assistant Examiner—Daniel J. O'Connor
Attorney, Agent, or Firm—Weiser, Stapler & Spivak

[57] ABSTRACT

A batten, adapted to retain at least one of a pair of juxtaposed, unitary, coextruded solar collector panels to the structural members of a building, the batten having a substantially horizontal retention member, portions of which extend over portions of the top of the adjacent collector panels, and a pair of substantially vertical leg members contacting and depending from the retention member and adapted to retain the adjacent collector panels in juxtaposed position, the batten further allowing for thermal expansion in a lengthwise and crosswise direction, while also reducing bowing of the collector panels from their planar configuration. The batten is capable of unitary formation in lengths sufficient to retain the adjacent collector panels in place along substantially their entire length.

27 Claims, 9 Drawing Figures

BATTEN FOR MOUNTING A UNITARY SOLAR COLLECTOR PANEL

This application is a continuation-in-part of my co-pending application Ser. No. 645,648, filed Dec. 31, 1975, now U.S. Pat. No. 4,114,597, issued Sept. 19, 1978.

BACKGROUND OF THE INVENTION

This invention relates generally to the field of solar energy collector panels, and in particular to a batten which is adapted for use in safely retaining a system of unitary, co-extruded solar collector panels of substantial length to a building.

Recent realizations that alternative energy sources to fossil fuels must be developed have caused substantial efforts to be made in developing a commercially acceptable solar energy collection system. The essential component of any solar energy collection system being the solar collector panel, a substantial amount of effort has been expended in the development of this element of the system.

Initial efforts to develop a useful solar collector panel often resulted in heavy, cumbersome structures involving the use of several, often incompatible, construction materials. This problem was particularly acute in the design of an acceptable flat plate type solar collector panel.

The flat plate type collector panel is generally more compatible with large structures, such as homes or offices, lending themselves well to the solar heating of air or water for use in the home or office, of water for distillation purposes, and even of water for use in heating a swimming pool. This compatability results from the existence on all buildings of large flat areas, such as the roof or walls, upon which such flat plate type collector panels may be mounted.

Although well suited for use in connection with a building, flat plate type collector panels had not yet found wide commercial acceptance for various reasons. Moreover, the cost of producing an efficient and workable collector panel often far outweighted its return, seriously limiting acceptance of such collectors by the public.

My patent application, Ser. No. 645,648, which is hereby incorporated by reference herein, discloses a flat plate type solar collector panel which serves to eliminate the above-mentioned drawbacks thus enabling production of a commercially acceptable solar thermal energy collection system. This is accomplished by providing a solar collector panel which is unitary in construction and which is capable of being produced in long, lightweight and continuous sections. In this manner entire portions of a structure may be covered with a series of such panels thereby enabling the conversion of sufficient amounts of solar thermal energy to provide for the heating needs of a consumer.

The unitary collector panels disclosed are produced by coextruding a selected combination of thermoplastics into long panels having heat insulating and heat absorbing layers along their entire length. In this manner the previously required combination of construction materials is replaced by a single unit requiring no individual construction or separate parts. The resulting units are lightweight which permits easy installation and also permits large surface areas to be completely utilized without requiring substantial shoring of the underlying structural members. The unit is also capable of being produced in large sizes and quantities decreasing both the cost of such units as well as the costs of installation and labor.

Although the unitary solar collector panels above mentioned are well suited to solving the problems presented in converting solar energy into heat it has been found that certain aspects of those collector panels are capable of improvement, further enhancing the utility and potential for public acceptance of the resulting solar energy collection system.

One such aspect concerns the method by which such panels are mounted to the physical structure of the building. In my patent application, Ser. No. 645,648, the unitary panels are affixed to the building's structural members using a plurality of screws or bolts, each provided with a protective washer, in order to retain the panels in position along their edges. Although this provides an acceptable means for mounting such panels, it has been found that a more efficient mounting system exists which serves to decrease the amount of labor required for installation of the panels to the structure, to assure a positive sealing force along the entire length of each unitary panel, and to allow for the expansion, in both a lengthwise and crosswise direction, while also preventing the bowing, which is encountered when the unitary collector panels are in use.

SUMMARY OF THE INVENTION

This invention relates generally to the field of solar energy collector panels, and in particular to a batten which is adapted to safely retain a plurality of unitary solar collector panels to the structural members of a building in a manner which permits rapid installation, positive sealing along the entire length of each unitary panel, expansion of the unitary collector panel in both a lengthwise and crosswise direction, and reduces bowing of the collector panels out of their planar configuration.

In order to convert radiation from the sun into useful thermal solar energy, a building structure is provided with a plurality of coextruded unitary solar collector panels. The panels are joined at each end by headers which are connected to a circulating system capable of directing the converted solar energy produced toward a useful purpose.

In accordance with the present invention, a batten is provided for use in retaining the plurality of unitary collector panels to the structural members of the building while also maintaining the several panels in proper spacial relationship to each other. To this end, a batten is provided which comprises a retention member which is substantially horizontal with respect to the general plane of the panel, portions of which extend over, and apply retentive forces against, portions of the top of the adjacent unitary collector panels, and two leg members, contacting and substantially vertically depending from the retention member, which are capable of maintaining two adjacent unitary panels in a predetermined spacial relationship with respect to each other. The preferred structure, which resembles a "pi" shaped configuration, is formed in long strips, preferably in lengths approximately equal to those of the unitary collector panels. In this manner entire collector panels may be quickly assembled and retained in place using a minimum member of parts and labor steps.

Several embodiments of such a batten are possible, applicability depending upon the specific design requirements presented by the environment of the installation site. The batten may be of a type having fixed legs, which may be used in connection with a conventionally constructed unitary panel, or with a unitary panel having corresponding interlocking features which are compatible with the batten. The batten may also be of a type having slidable legs, which permits a greater degree of expansion and parameter variation. In any event, the batten is constructed to permit quick assembly, to effectively prevent either the leakage or seepage of water between the collector panels to the structure, and to be inexpensive to manufacture and install.

Accordingly, it is an object of the present invention to provide a batten for use in affixing unitary solar collector panels to the structural members of a building.

It is another object of the present invention to provide a batten which is capable of retaining the unitary collector panels to the structural members of the building along the entire length of the panels.

It is still another object of the present invention to provide a batten for use with unitary solar collector panels which provides secure retention of the panels to the structure while also permitting the panels to expand in both a lengthwise and crosswise direction.

It is still another object of the present invention to provide a batten for use with unitary solar collector panels which permits expansion of the panels, and further, prevents both concave and convex bowing of the collector panels.

It is still another object of the present invention to provide a batten for use with unitary solar collector panels which is resistive to water leakage and seepage along the seam between the batten and the collector panels.

It is still another object of the present invention to provide a batten for use with unitary solar collector panels which is well adapted for affixing the collector panels to a building using a minimum of labor efforts.

It is still another object of the present invention to provide a batten for use with unitary solar collector panels which is simple in construction, inexpensive to manufacture and easy to use.

These objects and others will become apparent to those skilled in the art from the following disclosure of the preferred embodiments of the invention taken in conjunction with the drawings provided in which like reference characters refer to similar parts throughout the several views provided, in which:

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Figure 1:
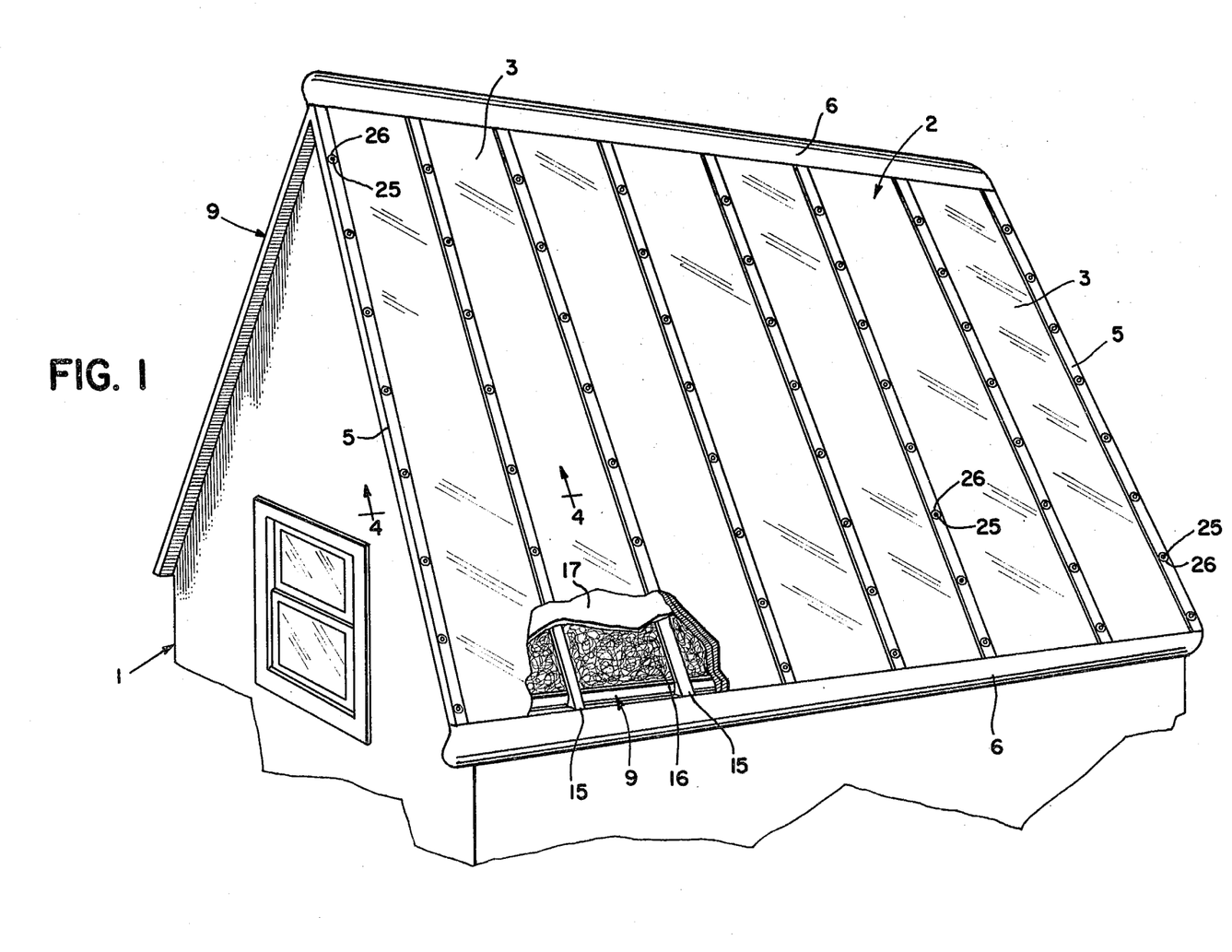
FIG. 1 is a perspective view of a structure which has been provided with a solar energy collection system having collector panels which are in vertical, transverse alignment with the structure, and which is partially broken away to show interior construction details.

Referring now to the drawings, there is shown in FIG. 1 a building structure 1 which has been provided with a solar energy collector system 2. The solar energy collector system 2 comprises a plurality of flat plate-type solar collector panels 3 which are affixed to the structure 1 using a plurality of battens 4,5, and a pair of headers 6 attached to the ends of the collector panels 3.

The solar collector panels 3 would be generally of the type disclosed in my patent application, Ser. No. 645,648; a unitary coextruded panel formed of synthetic thermoplastic, having a heat insulating region 7 and a heat absorbing region 8. One example of such a collector panel 3 may be seen in FIG. 7.

Figure 7:
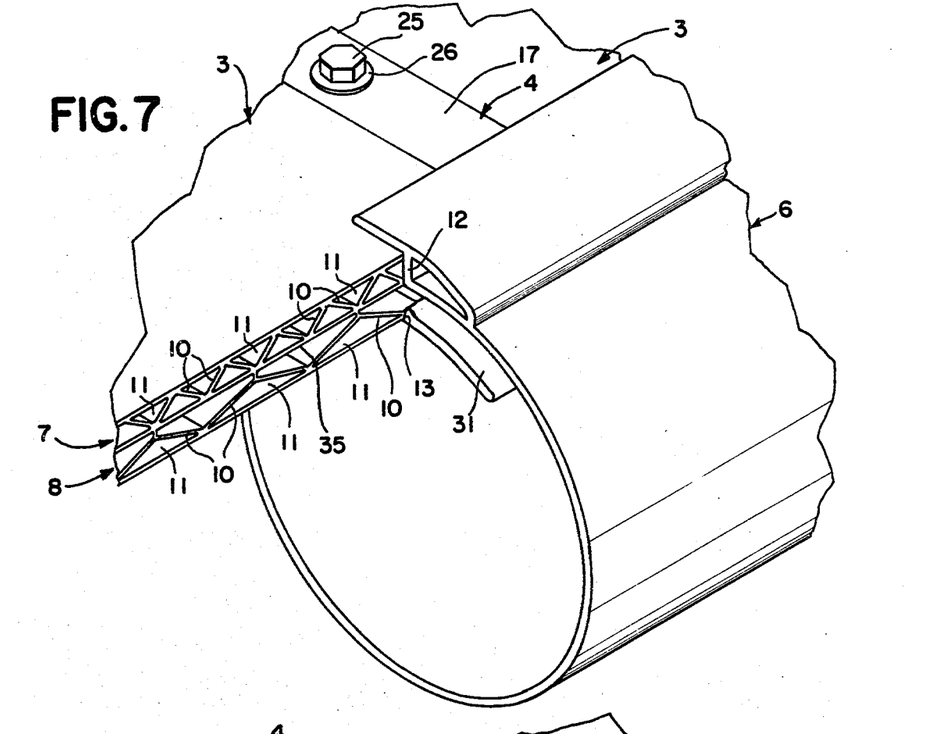
FIG. 7 is a partial, isometric view illustrating the interconnection between the solar collector panels, the solar collector header and the batten.

Each solar collector panel 3 is provided with a heat insulating region 7 and a heat absorbing region 8. The heat insulating region 7 would be transparent and thus capable of transmitting therethrough the major part of solar spectral radiation. The heat absorbing region 8 will be opaque, black or dark and thus capable of absorbing solar radiation passed through the heat insulating region 7.

As illustrated in FIG. 7 each solar collector panel 3 is provided with a plurality of longitudinally extending channels 11 defined by ribs 10. The heat insulating region 7 and the heat absorbing region 8 are separated from each other by a longitudinally extending divider 35. Various fluids may then be provided within the channels 11 to utilize the solar thermal energy absorbed by the collector panels 3. For example, the heat insulating region 7 would generally be provided with air. By sealing the ends of the channels 11 forming the heat insulating region 7 the air is prevented from circulating, thereby forming an insulating layer between the heat absorbing region 8 and the outside elements. The heat absorbing region 8 would generally be provided with a fluid such as air, a silicone fluid, water or a water-ethylene glycol mixture, which is then circulated through the channels 11 of the heat absorbing region 8, thereby heating the fluid, which would then be carried away for use with the remainder of the system (not shown). Of course, it is to be understood that any one of several known fluids could be utilized in connection with either the heat insulating region 7 or the heat absorbing region 8 depending upon the particular application involved.

Each end of the solar collector panel 3 would be provided with a header 6 to permit connection of the collector panel 3 to the remainder of the heating system.

The headers 6 may be manufactured in a manner similar to that of the solar collector panels 3, by extrusion of a synthetic thermoplastic. Extrusion permits formation of the headers 6 as long, unitary structures which may quickly and easily be attached to the collector panels 3 along the entire length of the interface between those elements.

As illustrated in FIG. 7 the header is preferably, essentially circular in cross-section, although headers of other shapes may also be produced, and is provided with an output channel 31, a fluid blocking portion 12 and a means for connecting the header 6 to the solar collector panel 3. The fluid blocking portion 12 is provided to prevent the fluid contained within the heat insulating region 7 from circulating, thus providing insulation between the heat absorbing region 8 and the outside elements. The output channel 31 is adapted to communicate with the channels 11 of the heat absorbing region 8 in a manner which improves the uniformity of flow of the fluid as it flows between the collector panels 3 and the headers 6, thus improving the overall efficiency of the system. As a means for connecting the header 6 to the solar panels 3, the header 6 is provided with upper and lower brackets 13 which overfit the collector panels 3 either frictionally, by use of a suitable bonding agent, or by use of a mechanical means, e.g. blind rivets. In this manner, the header 6 may be readily connected to one or more collector panels 3 as desired.

The solar collector panels 3 are affixed to the structure 1 using a plurality of battens; either the battens 4 which are used to affix adjacent panels 3 to each other and to the structure 1, or end battens 5 used to affix the outer edges of the outermost panels 3 to the structure 1 and to seal the edges of the roof 9 of the structure 1 from the outside elements.

Figure 1A:
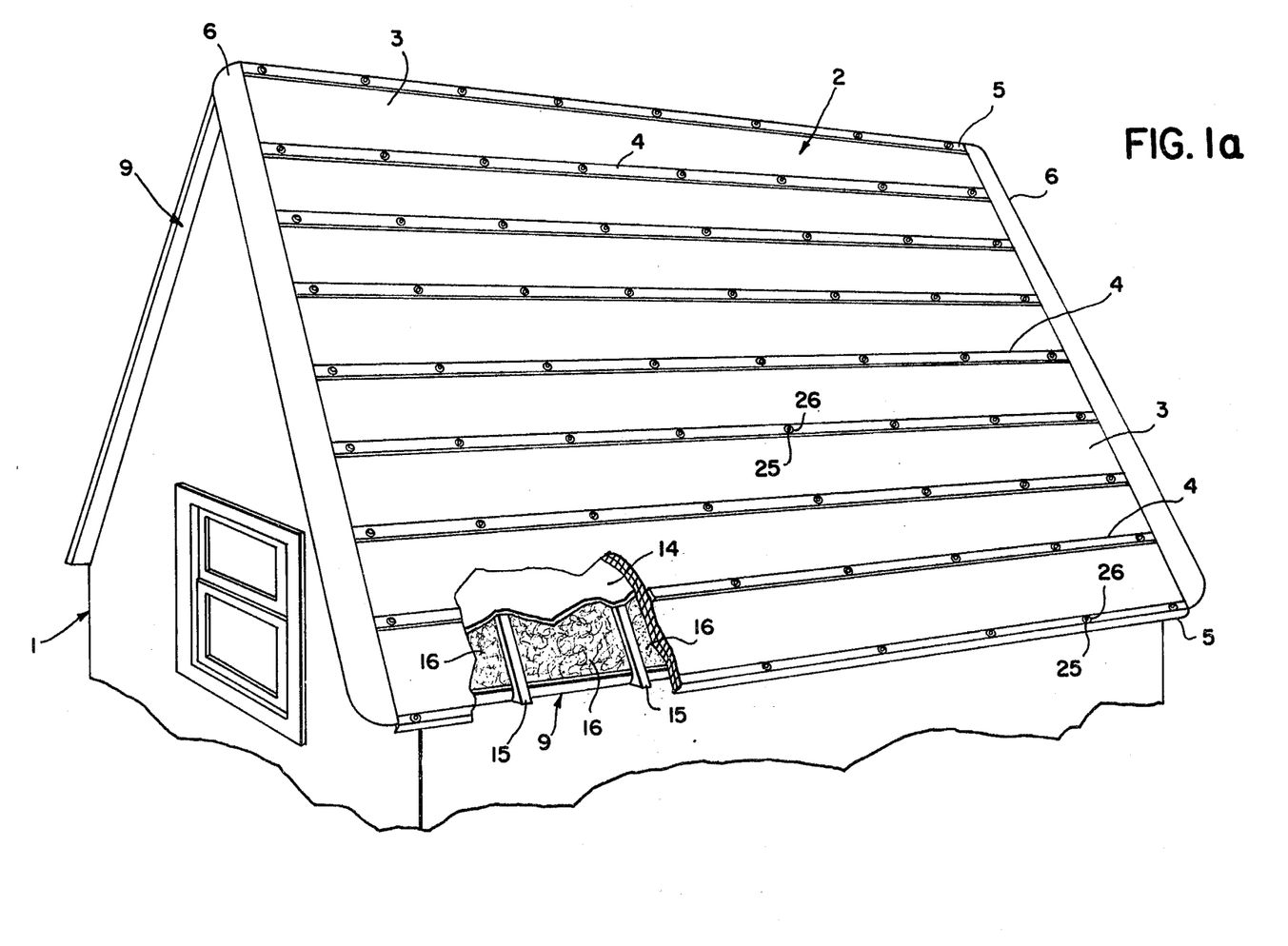
FIG. 1a is a perspective view of a structure which has been provided with solar energy collection system having collector panels which are in horizontal, longitudinal alignment with the structure, and which is partially broken away to show interior construction details.

The collector panels 3 illustrated in FIG. 1 are affixed to the roof 9 in a vertical, transverse orientation, the headers 6 extending along the top and bottom of the roof 9. However, as illustrated in FIG. 1a, it is equally possible to orient the collector panels 3 longitudinally, the headers 6 extending along the edges of the roof 9 rather than along its top and bottom. Transverse placement of the collector panels 3 on the roof 9 is preferred to reduce the potential for water to collect along the seams between the collector panels 3 and battens 4,5, and thus seep through the seams to the roof 9 below.

As illustrated in FIG. 1, the solar collector panels 3 are preferably applied to the structure 1 over a substrate 14 formed of plywood, or other sheet material, which may be conventionally applied to the rafters 15 of the roof 9 prior to installation of the collector panels 3. Insulation 16 may be applied beneath the substrate 14 and between the rafters 15 in known fashion. The solar collector panels 3 may then be placed over the substrate 14 in juxtaposed relationship and retained in place by the battens 4,5, in a manner to be hereinafter more fully described. The battens 4,5 may be attached to the substrate 14 and/or the rafters 15 using any of several fastening means, for example, nails, screws or the bolts 25 illustrated, placed at multiple locations along the battens 4,5. Although not required, it is preferred that the fastening means be equally spaced along the battens 4,5. The bolts 25 may be provided with flexible washers 26 in order to absorb some of the stress provided when the bolts 25 are tightened and to prevent water leakage or seepage around the bolts 25. In this manner the collector panels 3 are securely mounted to the roof 9 of the structure 1.

Each solar collector panel 3 would advantageously be on the order of 16 inches in width and would be of a length appropriate to cover the entire length or width of a structure (e.g. 15-20 feet). A width of 16 inches is advantageous in that many structures are provided with rafters 15 having 16 inch centers. Thus a collector panel 3 may be placed between and firmly attached to a pair of rafters 15. Of course, other widths are equally possible. Many homes presently have rafters 15 placed at 24 inch intervals. Collector panels having 24 inch widths would be appropriate in such cases. Although preferred, a one to one correspondence between rafter centers and collector panel width is not required, and collector panels 3 having any appropriate width may be utilized if desired.

Collector panels 3 of the type above described are readily produced by the extrusion process, having widths preferably on the order of one to two feet. Such panels may be produced in long sections, the length generally being limited only by convenience and bulk. Fifteen foot sections have been found useful in many applications, however other lengths are clearly possible. Several such panels 3 may be laid adjacent to each other upon the roof 9 of the building structure 1, thereby enabling the complete coverage and usage of existing space.

After affixing the collector panels 3 to the roof 9 the headers 6 may be attached to the ends of the collector panels 3. The headers 6 may then be connected to the remainder of the circulatory system as desired.

Figure 2:
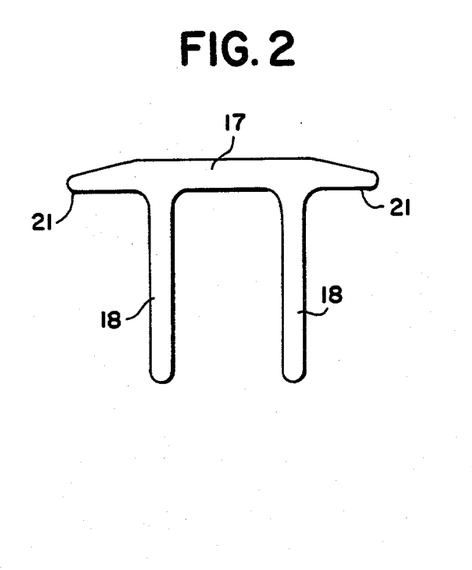
FIG. 2 is a cross-sectional view of a batten used to join together two adjacent solar collector panels.
Figure 3:
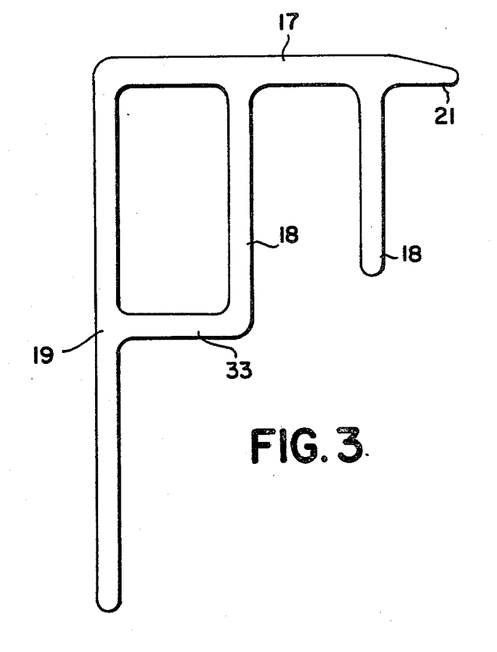
FIG. 3 is a cross-sectional view of a batten used to join the outer edge of the outermost solar collector panel to the structure.

FIGS. 2 and 3 illustrate in greater detail the configuration of a batten 4 and an end batten 5, respectively. In both cases each batten 4,5, is provided with a substantially horizontal retention member 17, portions of which are capable of extending over the top of the adjacent collector panels 3. The retention member 17 should be wide enough to engage adjacent collector panels 3 in addition to providing sufficient room for expansion of the panels 3 and to accommodate the fastening means used to retain the battens 4,5 to the roof 9.

Each batten 4,5 is also provided with a pair of preferably, substantially vertical leg members 18 which determine the orientation of the collector panels 3, as well as the space between the battens 4,5 and the adjacent collector panel or panels 3. The leg members 18 are in contact with and depend beneath the retention member 17. In this manner, the leg members 18, in combination with the retention member 17, are capable of engaging adjacent collector panels 3, forming an interlocking unit which is easily affixed to the roof 9. Accordingly, the leg members 18 will hereinafter be referred to as interlocking members 18. Although two interlocking members 18 are illustrated and are preferred, it is to be understood that battens 4,5 having one or several interlocking members 18 could also be provided if desired.

The end battens 5 are provided with additional structure particularly suited to sealing the edges of a roof 9 fitted with a solar collector system 2. As illustrated in FIG. 3, the end batten is provided with a side wall 19 which extends downward from the retention member 17 to a point below the bottom of the interlocking members 18. The length of the side wall 19 is preferably sufficient to enable the side wall 19 to completely cover the substrate 14 as well as the outer edge of the roof 9. In this manner, the roof 9 is protected from the water leakage or seepage that would occur through an otherwise open seam. The side wall 19 is also preferably attached to one of the interlocking members 18 for strengthening purposes, such as by the horizontally extending segment 33 illustrated.

Both the batten 4 and the end batten 5 are well suited to production by the extrusion process. Accordingly, battens of the shapes illustrated may be produced in long sections, equivalent in length to that of the solar collector panels 3. In this manner, assembly of the solar collector system 2 is greatly facilitated requiring a minimum of parts and assembly time. The battens 4,5 may be formed of the same material used to form the collector panels 3, a synthetic thermoplastic. If preferred, aluminum could also be used. Other similar materials could also be used as could other manufacturing processes.

Figure 4:
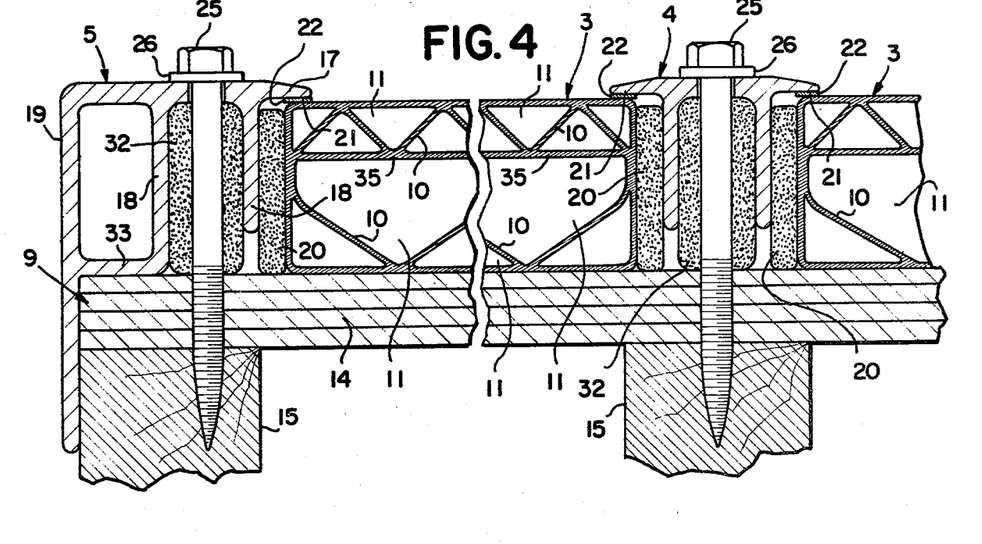
FIG. 4 is a partial, sectional view of the solar collector system taken along line 4—4 of FIG. 1 illustrating a first embodiment of the batten mounting system.

FIG. 4 illustrates a first embodiment of a batten 4,5, which may be used to affix a plurality of solar collector panels 3 to a roof 9. As illustrated, the collector panels 3 would be placed over the substrate 14 in a juxtaposed spacial relationship.

Interposed between respective collector panels 3 would be a batten 4, preferably separated from each collector panel 3 by a compressible pad 20. The distance between adjacent collector panels 3 is therefore regulated by the spacing between the interlocking members 18 and the width of the compressible pads 20. Since the spacing is predetermined, assembly may be performed by persons unskilled in the particular requirements of solar collector construction.

Tolerances capable of assuring safe installation, yet which will also permit adequate lateral expansion of the collector panels 3, are primarily determined by the dimensions of the compressible pads 20. Accordingly, it is preferred that the pads 20 be sufficiently compressible to permit anticipated lateral expansion of the collector panels 3, yet sufficiently resilient to assure proper spacing between the collector panels 3 and the batten 4. Several materials which are well suited for use in the manufacture of such compressible pads 20 include polymers such as neoprene, polyethylene, ethylene-propylene diene monomers, etc. These may be closed cell foams, or in the form of an elastomeric profile with spring-like ribs.

The retention member 17 extends over the top, outer edges of the adjacent collector panels 3 thereby applying forces against them toward the roof 9 along the entire length of the collector panels 3. The retention members 17 should therefore be wide enough to engage the top, outer edge of any adjacent collector panel 3 while also providing sufficient space between the collector panels 3 to permit their expansion.

The tightness of the retention member 17 determines the amount of force applied against the collector panels 3. The degree of force applied should be appropriate to assure secure retention of the collector panels 3 to the roof 9 yet not so much as to cause cracking of the collector panels 3 as the battens 4 are fastened down. Actual fastening is provided by fastening means, such as the bolts 25 illustrated, placed through holes provided along the batten 4. The bolts 25 may be attached to the substrate 14 if a sufficiently strong material is used, or in any event, and preferably, to the rafters 15 of the roof 9. In this manner, a secure and safe installation is obtained.

The outer edges of the outermost collector panels 3 are affixed to the roof 9 using an end batten 5 specially designed for that purpose. One half of the end batten 5 is essentially similar to the batten 4. This half is used to engage the outer edge of the collector panel 3 and to retain it to the roof 9 in the same manner as the batten 4. The remaining half of the end batten 5 is configured to seal the edge of the roof 9 from the outside elements and to provide a finished look to the installation. This is accomplished by providing the end batten 5 with a side wall 19 which extends from the retention member 17 below the collector panels 3 and the substrate 14 to the structure of the building 1. In this manner, moisture found on the collector panels 3 which drains over the edge of the roof 9 and the batten 5 is prevented from entering the structure of the building 1 providing a modest degree of weatherproofing as is customary in the art of building construction.

As with the batten 4, the end batten 5 is manufactured so that the person constructing the solar collector system 2 need not be highly skilled in that art. The distance between the edge of the roof 9, the interlocking members 18 and the collector panel 3 are therefore all predetermined by properly dimensioning the end batten 5. Also, a compressible pad 20 such as that used in connection with the batten 4 would preferably be provided, and would operate in the same manner.

The batten 4 and the end batten 5 above described are well suited to retaining a plurality of collector panels 3 to the roof 9 of a structure 1. However, for certain applications it may be preferable to use one of several possible alternative batten designs rather than that above described.

As an example, for a climate where heavy or prolonged rainfall is encountered, as well as for damp climates, it may be desirable to provide additional weatherproofing to the battens 4,5. This may be accomplished by providing the lower lips 21 of the retention member 17 with a sealing strip 22 which is adapted to prevent the entry of moisture from the outer surface of the collector panels 3 into the space found between respective collector panels 3. This sealing strip 22 may either be extruded as part of the lip 21 during the manufacturing process, of it may take the form of a separate padded strip affixed to the lip 21 after manufacture of the battens 4,5.

Figure 5:
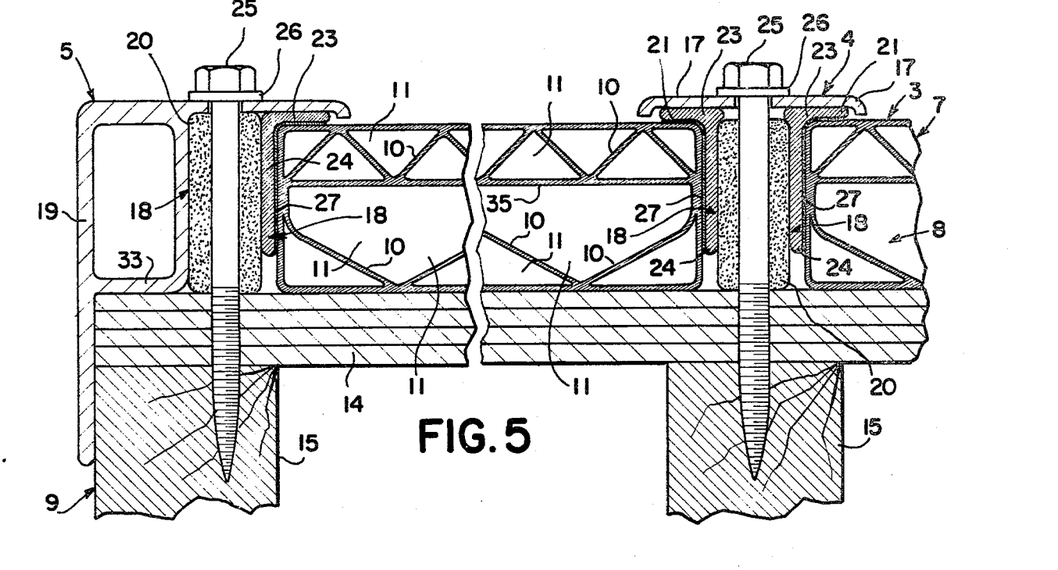
FIG. 5 is a sectional view of the solar collector system taken along line 4—4 of FIG. 1 illustrating a second embodiment of the batten mounting system.

In FIG. 5 there is shown a second, alternative embodiment of both the batten 4 and the end batten 5. In this embodiment the interlocking members 18 are in direct contact with the collector panels 3 and are allowed to move or slide with the collector panels 3 as they expand or contract. In order to maintain the interlocking members 18 in contact with the collector panels 3, there is provided a compressible pad 20 similar to that provided for use in connection with the first embodiment of FIG. 4. However, in this case the compressible pad 20 is found at the center of the battens 4,5 rather than toward their outer edges to provide a degree of outward force against the interlocking members 18. To facilitate assembly of the system, it is preferable to directly connect the interlocking members 18 to opposing sides of the compressible pad 20, thereby forming a unitary structure which is easily handled. This may be accomplished, for example, by using a conventional bonding agent.

The retention member 17 is modified to provide its retentive forces against the interlocking members 18 rather than directly against the collector panels 3. Therefore, the lower lip 21 of the retention member 17 would generally not contact the collector panels 3, although it could do so if additional support was required.

The interlocking members 18 are provided with a substantially flat upper portion 23 which is substantially parallel to the retention member 17. The flat upper portion 23 and the substantially vertical portion 24 are configured to contact the collector panel 3 along its top and outer edges. Contact may be maintained in this manner even during expansion or contraction of the collector panel 3.

The above configuration may, for example, be used where a need for increased weatherproofing is indicated. The interlocking member 18 may be provided with a seal 27 along the entire edge which is in contact with the collector panel 3. As a result, water sealing is provided along portions of the top of the collector panel 3 as well as along its outer edge. This seal may be maintained irrespective of the amount of expansion or contraction encountered during use of the collector panels 3, providing the additional weatherproofing often required in damp climates.

Figure 6:
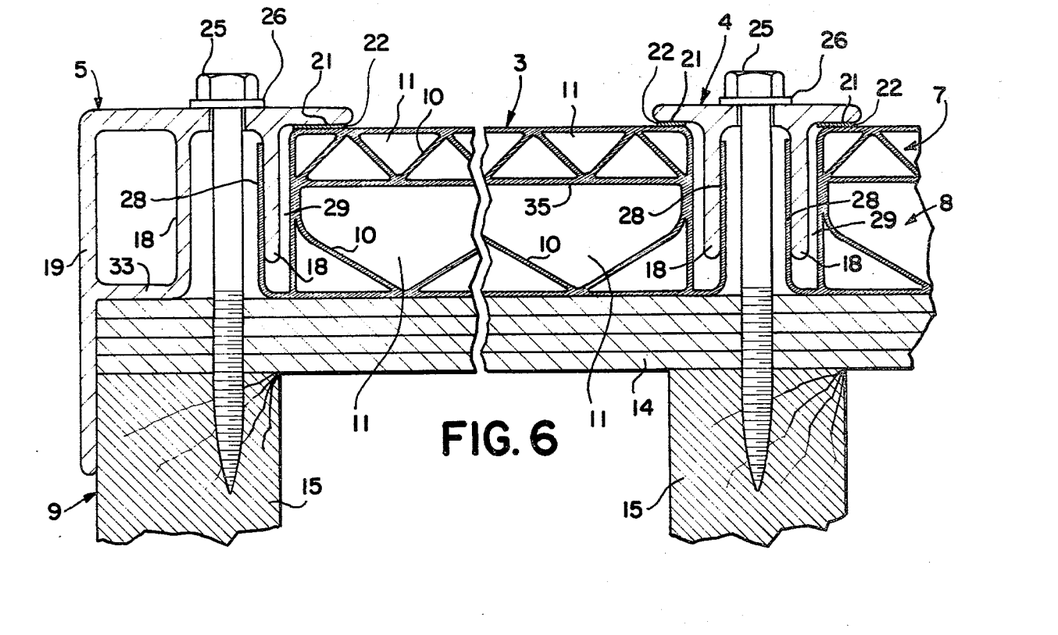
FIG. 6 is a sectional view of the solar collector system taken along line 4—4 of FIG. 1 illustrating a third, preferred embodiment of the batten mounting system.

In FIG. 6 there is shown a third, preferred embodiment of both the batten 4 and the end batten 5. In this embodiment the physical features of the battens 4,5 are essentially similar to those of the first embodiment. However, in this case the collector panels 3 are particularly adapted for use with such battens 4,5.

The collector panels 3 are provided, along each outer edge, with an interlocking lip 28. The lip 28 extends outwardly and then upwardly from the bottom of the collector panel 3. Such a lip 28 is easily produced as part of the collector panel 3 during its manufacture, increasing the cost of producing such a panel only minimally. The width of the space defined between the collector panel 3 and the lip 28 should be sufficient to accommodate both the interlocking member 18 of the battens 4,5 and any anticipated expansion of the collector panel 3.

Assembly of the solar energy collector system 2 would proceed similarly to that above described. However, in this case the interlocking member 18 would be positioned to engage the lip 28, rather than being positioned adjacent to the collector panel 3. The battens 4,5 would then be affixed in position as before, the lower lip 21 of the retention member 17 retaining the collector panels 3 to the roof 9.

Such an interlocking configuration serves to correct many of the problems encountered with previous collector panel mounting systems. Expansion is freely provided for by the vacant space 29 left between the collector panel 3 and the interlocking member 18. The amount of space required to permit adequate expansion may be predetermined and thus provided. Contraction of the collector panels 3 is permitted but only to a limited extent. This is accomplished by dimensioning the interlocking lip 28 and the interlocking member 18 so that the inner face of the interlocking lip 28 abuts the inner face of the interlocking member 18. Contraction of expanded panels, such as is encountered when the intensity of the solar radiation impinging upon the collector panels 3 decreases, although permitted, is regulated by interaction between the lip 28 and interlocking members 18. To minimize the problems caused by contraction of the collector panels 3, it is preferable to install the collector panels 3 during cooler periods of the day. It is also possible to shield the collector panels 3 during their use, to minimize direct solar heating of the collector panels 3, thereby reducing the degree of expansion encountered.

Moreover, such a configuration provides a reasonable degree of weatherproofing. Weather sealing along the lower lip 21 of the retention member 17 may be provided as previously mentioned. In addition, the interlocking lip 28 forms a well which prevents water from seeping directly between the collector panel 3 and the interlocking member 18.

Figure 8:
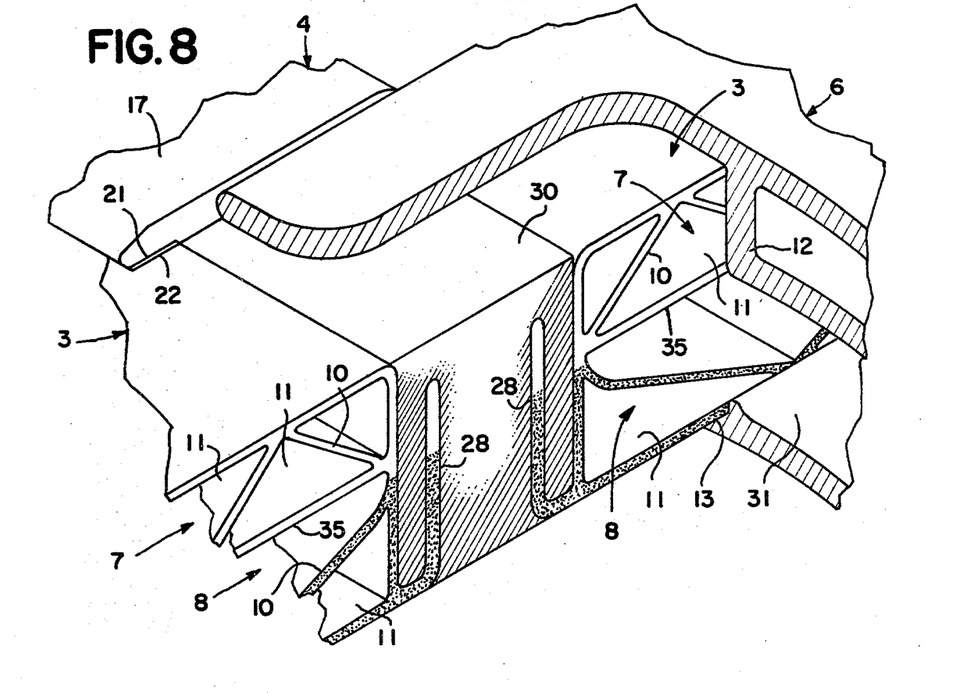
FIG. 8 is an enlarged, partial isometric view of the interface between the solar collector panels, the header and the batten.

FIGS. 7 and 8 illustrate the interface between the collector panels 3, the batten 4 and the header 6. In connecting the header 6 to the collector panels 3, a pair of brackets 13 are used, the collector panel 3 being slid between the brackets 13 until forward movement is stopped by the fluid blocking portion 12. In order to accommodate this placement, the battens 4,5 must be sized to permit complete insertion of the collector panels 3 between the brackets 13 of the header 6 without interference. For this reason the battens 4,5 would preferably be undercut sufficiently to accommodate insertion of the header 6 over the collector panels 3 as illustrated in FIG. 7.

In addition, to prevent fluid from entering the area between adjacent collector panels 3, a fluid blocking seal or plug 30 is placed over the end of the joint formed between the battens 4,5 and the collector panels 3. It is also possible to provide a sealing means, such as the strip 32 illustrated in FIG. 4, between the interlocking members 18, along the entire length of the battens 4,5 if desired, further sealing the area between collector panels 3 from the entry of fluid therein. The plug 30 and sealing strip 32 may be formed of any fluid resistive substance, closed-cell foams of neoprene, polyethylene or ethylene-propylene diene monomer (EPDM) rubber being particularly suitable. After insertion of the end plug 30 and/or sealing strip 32 in the joint, the header 6 may then be placed over the ends of the collector panels 3 completing the assembly of the components formed on the roof 9 of the structure 1.

The above described battens 4,5 therefore provide a quick, simple and effective means for mounting long, unitary solar collector panels 3 to the roof 9 of the structure 1. Although the battens 4,5 are particularly suited for use in connection with a unitary solar collector panel it is equally possible to use such battens 4,5 with other panel designs. The battens 4,5 are well suited for use with any plastic or glass type collector panel including panels of multi-component or modular design, an example of the latter type of construction being the modular solar panel produced by the Williams Research Co., illustrated in Design News, Jan. 9, 1978 at page 22.

It is also possible to use the battens 4,5 to mount a solar energy collector system to various parts of a structure or building. For example, it is possible to utilize such battens 4,5 in mounting a similar system to the wall of a building if such placement is deemed desirable. Placement of components in such cases would be essentially similar to a roof mounted system.

A further advantage such a mounting system provides is that repair of a damaged panel is greatly facilitated. Previously, a damaged panel could only be removed by unbolting the panel from the roof, chipping away at the calking used to seal the panel from the outside elements and removing the panel for replacement with a new unit. Using the battens 4,5 above described, all that is required is to unbolt the battens 4,5 from the roof 9, lift the unit out of position by flexing the panel 3 sufficiently to disengage it from the headers 6, and then replace it with a new unit by reversing the above steps. Thus, repair costs are reduced in addition to installation costs.

The battens 4,5 have been described as being of a length substantially equivalent to that of the unitary collector panels 3. This configuration is preferred since a one piece construction reduces the number of parts required to assemble a completed system 2, and reduces the number of seams in the system, to reduce the potential for leakage. However, it is also possible to construct battens 4,5 having shorter unit lengths. For example, battens 4,5 having standardized lengths such as 2 feet or 3 feet may be produced. It is also possible to produce battens 4,5 which are on the order of 1 to 3 inches, if desired.

It may therefore be seen that the above disclosed invention serves well to accomplish the objects previously stated. It may also be seen that the above described invention may be embodied in other specific forms in addition to those above disclosed and therefore the disclosure made should be interpreted in an illustrative and not a limiting sense.

I claim:

1. A batten which retains juxtaposed unitary, coextruded, synthetic thermoplastic solar collector panels to a structure for assembly of a solar thermal energy collector system thereon, which batten comprises
   a substantially horizontal retention member adapted to extend over and engage a top portion of the juxtaposed collector panels which are adjacent to the batten; and
   a pair of leg members connected to the retention member, which, in cooperation with the retention member, are adapted to engage the sides of adjacent collector panels and to mount the collector panels onto the structure while allowing for thermal expansion of the collector panels in a lengthwise and crosswise direction and to minimize bowing of the collector panels out of their normally planar configuration;
   wherein at least some of the solar collector panels have a lip extending outwardly from the bottom, outer edges of the solar collector panels, and then upwardly, for a distance less than the height of the collector panels; and
   wherein the leg members of the batten engage the lip of the collector panels.

2. The batten of claim 1 wherein the lip is integrally formed with the collector panel.

3. The batten of claim 1 wherein the inner face of the leg member of the batten abuts the inner face of the interlocking lip, and
   wherein the outer face of the leg members engaging the lip and the outer edge of the collector panel are not in contact with each other.

4. The batten of claim 3 wherein the separation is sufficient to allow the collector panel to expand without its outer edge contacting the outer face of the leg member.

5. A batten which retains juxtaposed unitary, coextruded, synthetic thermoplastic solar collector panels to a structure for assembly of a solar thermal energy collector system thereon, which batten comprises
   a substantially horizontal retention member adapted to extend over and engage a top portion of the juxtaposed collector panels which are adjacent to the batten;
   a pair of leg members in contact with the retention member, which, in cooperation with the retention member, are adapted to engage the sides of adjacent collector panels and to mount the collector panels onto the structure while allowing for thermal expansion of the collector panels in a lengthwise and crosswise direction and to minimize bowing of the collector panels out of their normally planar configuration; and
   a compressible pad positioned between at least one of the leg members and the outer edge of the nearest adjacent collector panel.

6. The batten of claim 5 wherein the pad is a polymer selected from the group consisting of neoprene, polyethylene or an ethylene-propylene diene monomer.

7. The batten of claim 6 wherein the polymer is a closed cell foam.

8. A batten which retains juxtaposed unitary, coextruded, synthetic thermoplastic solar collector panels to a structure for assembly of a solar thermal energy collector system thereon, which batten comprises
   a substantially horizontal retention member adapted to extend over and engage a top portion of the juxtaposed collector panels which are adjacent to the batten; and
   a pair of leg members in contact with the retention member, which, in cooperation with the retention member, are adapted to engage the sides of adjacent collector panels and to mount the collector panels onto the structure while allowing for thermal expansion of the collector panels in a lengthwise and crosswise direction and to minimize bowing of the collector panels out of their normally planar configuration;
   wherein the leg members are in slidable arrangement with respect to the retention member.

9. The batten of claim 8 wherein the compressible pad is sufficiently resilient to permit alignment of the adjacent collector panels during assembly of the solar energy collector system yet sufficiently compressible to permit expansion of the collector panels after assembly of the collector system.

10. The batten of claim 8 wherein the leg members terminate at their top in an upper portion, the upper portion being in contact with and positioned beneath the retention member along its top edge and in contact with the top portion of the collector panel along its lower edge.

11. The batten of claim 10 wherein only the leg members and the upper portions connected thereto are in contact with the nearest adjacent collector panel.

12. The batten of claim 11 which further comprises a seal, located between the leg member and its nearest adjacent collector panel, which is capable of preventing moisture found on top of the collector panels from passing between the leg member and its adjacent collector panel.

13. The batten of claim 12 wherein the seal also extends along those portions of the upper portion of the leg members that contact the top of the adjacent collector panel.

14. The batten of claim 10 wherein the retention member does not contact the top of the adjacent collector panel it engages.

15. The batten of claim 8 further comprising a compressible pad located between the leg members.

16. The batten of claim 15 wherein the leg members are connected to opposing edges of the compressible pad.

17. The batten of claim 15 wherein the compressible pad is sufficiently resilient to maintain the interlocking members in contact with the collector panels, yet sufficiently compressible to permit expansion of the collector panels.

18. A batten which retains juxtaposed unitary, coextruded, synthetic thermoplastic solar collector panels to a structure for assembly of a solar thermal energy collector system thereon, which batten comprises

- a substantially horizontal retention member adapted to extend over and engage a top portion of the juxtaposed collector panels which are adjacent to the batten; and
- a pair of leg members connected to the retention member, which, in cooperation with the retention member, are adapted to engage the side of the adjacent collector panel and to mount the collector panel onto the structure while allowing for thermal expansion of the collector panel in a lengthwise and crosswise direction and to minimize bowing of the collector panel out of its normally planar configuration;
- wherein one leg member further extends into a substantially horizontal segment which, in addition to the substantially horizontal retention member, is connected to a side wall, which side wall extends downward from the retention member to engage the structure.

19. The batten of claim 18 wherein the side wall seals the edge of the structure which is engaged by the batten from external moisture.

20. The batten of claim 19 wherein the side wall extends downward from the retention member and beyond the plane in which the bottom of the collector panel contacts the structure.

21. The batten of claim 18 wherein the side wall is substantially linear.

22. The batten of claim 1, 5, 8 or 18 in combination with a sealing plug, inserted into a space located between adjacent collector panels and adjacent to the transverse edge of the batten, the sealing plug being adapted to seal the interior of the space from the remainder of the solar energy collector system.

23. The batten of claim 22 wherein the sealing plug is extruded from a polymer selected from the group of materials consisting of neoprene, polyethylene, and ethylene-propylene diene monomers.

24. The batten of claim 23 wherein the polymer is a closed cell foam.

25. The combination which comprises:
  (1) a unitary, coextruded solar thermal collector panel, the panel comprising
    a first, heat insulating region adapted to allow the passage of solar thermal radiation, the first region being divided into a plurality of first channels of which adjacent first channels are defined by first common ribs; and
    a second, heat absorbing region juxtaposed from the first region which is capable of absorbing solar radiation and transferring it to a fluid, the second region being divided into a plurality of second channels of which adjacent second channels are defined by second common ribs; and
    the first and second regions are defined one from the other by a common divider, and
  (2) a batten, the batten being one of the battens of claim 1, 5, 8 or 18.

26. The combination which comprises:
  (1) a unitary, coextruded solar thermal collector panel, the panel comprising
    a first, heat insulating region adapted to allow the passage of solar thermal radiation, the first region being divided into a plurality of first channels of which adjacent first channels are defined by first common ribs; and
    a second, heat absorbing region juxtaposed from the first region which is capable of absorbing solar radiation and transferring it to a fluid, the second region being divided into a plurality of second channels of which adjacent second channels are defined by second common ribs; and
    the first and second regions are defined one from the other by a common divider, and
  (2) a batten, the batten being one of the battens of claims 1, 5 or 8, and
  (3) an end batten comprising
    a substantially horizontal retention member adapted to extend over and engage a top portion of the juxtaposed collector panel adjacent to the end batten; and
    a pair of leg members connected to the retention member, which, in cooperation with the retention member, are adapted to engage the side of the adjacent collector panel and to mount the collector panel onto the structure while allowing for thermal expansion of the collector panel in a lengthwise and crosswise direction and to minimize bowing of the collector panel out of its normally planar configuration;
    wherein one leg member further extends into a substantially horizontal segment which, in addition to the substantially horizontal retention member, is connected to a side wall, which side wall extends downward from the retention member to engage the structure.

27. The batten of claim 1, 5, 8 or 18 which further comprises a seal, coextruded as part of the lower lip of the retention member substantially along its entire length, which seal is capable of preventing moisture found on top of the collector panels from passing between the batten and the collector panels which are contacted by the batten.

* * * * *